United States Patent [19]
Kavaya et al.

[11] Patent Number: 6,147,747
[45] Date of Patent: Nov. 14, 2000

[54] LIDAR REMOTE SENSING SYSTEM

[75] Inventors: Michael J. Kavaya, Huntsville; Farzin Amzajerdian, Madison, both of Ala.

[73] Assignee: The United States of America as represented by the Administrator of the National Aeronautics and Space Administration, Washington, D.C.

[21] Appl. No.: 09/134,704

[22] Filed: Aug. 14, 1998

Related U.S. Application Data

[60] Provisional application No. 60/060,001, Aug. 22, 1997.

[51] Int. Cl.⁷ .............................. G01C 3/08; G01C 1/00; G01B 11/26
[52] U.S. Cl. ...................................... 356/4.01; 356/141.1
[58] Field of Search ................................ 356/141.1, 4.01, 356/5.01, 5.1

[56] References Cited

U.S. PATENT DOCUMENTS

| | | |
|---|---|---|
| 4,311,385 | 1/1982 | Keene . |
| 4,326,799 | 4/1982 | Keene et al. . |
| 5,313,263 | 5/1994 | Abbiss et al. ........................... 356/28.5 |

OTHER PUBLICATIONS

"Return–Beam Derotator for Conscan Doppler Laser Anemometer", *NASA Tech Briefs*, Test and Measurement, Nov. 1996, p. 10a, vol. 20 No. 11, Associated Business Publications Co., NY, NY.

*Primary Examiner*—Stephen C. Buczinski
*Attorney, Agent, or Firm*—James J. McGroary

[57] ABSTRACT

A lidar remote sensing system wherein a laser signal is transmitted along an optical path through a telescope having a primary and secondary mirrors and a rotating prism at the telescope output. When the reflected signal from the target is received it is passed back through the system to a detector, where it is heterodyned with a signal from a local oscillator to detect Doppler frequency shifts in the returned signal. Since the prism is rotating, the prism will be at one position when the signal is transmitted and at another when the returned signal is received. This causes the reflected signal to be off the optical path, reducing the power of the returned signal. To correct this problem a de-rotator or prism is mounted for rotation, in synchronism with the rotating prism, about the optical path in a position to intersect the returned beam and refract it back onto the optical path to reduce the power loss in the returned signal.

12 Claims, 2 Drawing Sheets

LIDAR REMOTE SENSING SYSTEM

This application claims the benefit of the filing date of a provisional application filed on Aug. 22, 1997, provisional application No. 60/060,001.

ORIGIN OF THE INVENTION

The invention described herein was made in the performance of work under a NASA contract and is subject to the provisions of Public Law 96-517 (35 .U.S.C. 202) in which the contractor has elected not to retain title.

BACKGROUND OF THE INVENTION

1. Field of the Invention

This invention relates to lidar remote sensing systems.

2. Background information

Lidar remote sensing systems using conical scan patterns are known. Because of the angular lag between the transmitted beam and the return beam, the scan must be very slow or the system must be a "stop and stare" system. In the stop and stare system, the laser beam is transmitted and the scan is stopped until the return beam from the target arrives. This limits scanning speed and requires a relatively complex mechanical design in order to counter the force exerted by the scanner non-continuous motion and to absorb the resultant vibration.

If the scan is continuous, it must be very slow or the return beam will not travel along the optical path of the transmitted beam. The amount of deviation of the return beam from the optical path will depend primarily on the rate of the scan and the distance to the target of the transmitted beam. Because of the fact that the return beam does not follow the optical path, the power loss in the returned signal is significant. It would be desirable to have a scanning lidar remote sensing system in which the returned radiation travels along the optical path followed by the transmitted beam.

SUMMARY OF THE INVENTION

A lidar remote sensing system is provided wherein a laser beam is transmitted along an optical axis or path and through a telescope having a rotating scanning element toward a target and a return beam from the target passes through the scanning element and is reflected through the telescope to a detector. Because of the fact that the scanning element is in one position as the beam is transmitted and in another position when the return beam arrives, the return beam does not follow the optical axis or path of the system and a significant amount of power is lost from the return beam. This is corrected by using a beam de-rotator or prism positioned on the optical path in front of the detector. The de-rotator is rotated in synchronism with the scanning element. The de-rotator is made of a material transparent to laser radiation and has flat opposite sides positioned at a slight angle to each other. The off-axis return beam is refracted back to the optical axis or path by the de-rotator to lessen the power loss in the returned radiation. The use of the telescope is optional.

DESCRIPTION OF THE DRAWINGS

FIG. 5 is a fragmentary view showing the use of a mirror for the scanning element.

DETAILED DESCRIPTION OF THE INVENTION

Figure 1:
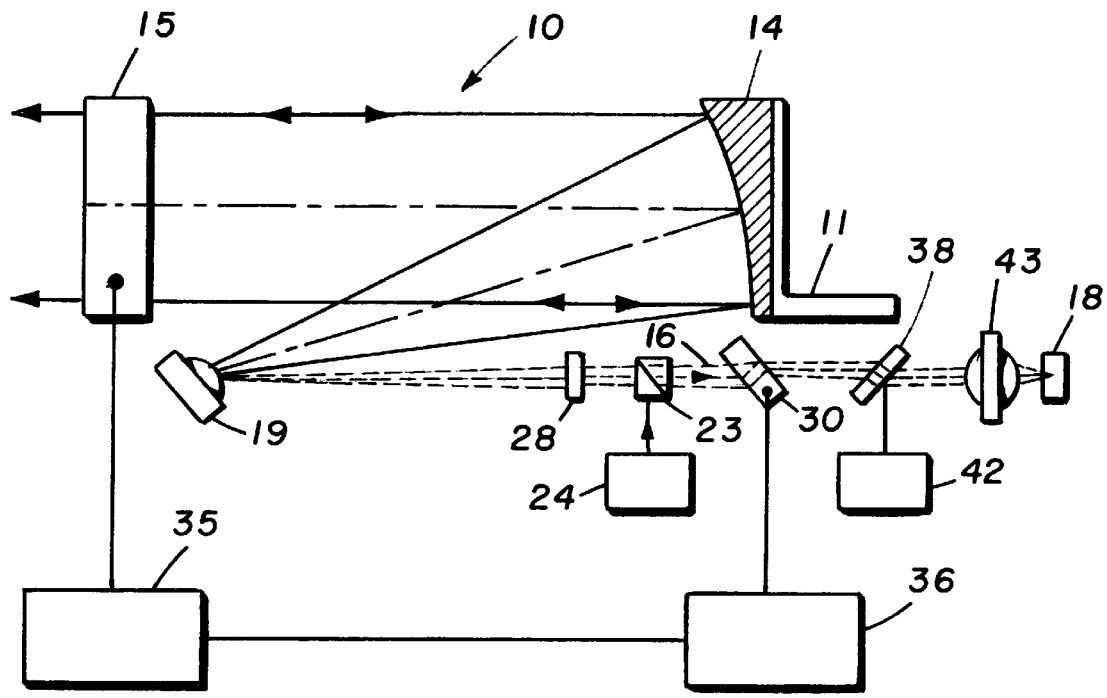
FIG. 1 is a schematic drawing showing the components of the lidar remote sensing system having a scanning element at one position and a beam de-rotator positioned to return the return beam to an optical path of the system.

Referring now in detail to the drawings, there is shown a lidar remote sensing system 10 having a frame 11 (FIG. 1) which supports the various elements of the system. Mounted on the frame 11 is a telescope having a parabolic primary mirror 14 at one end and a secondary mirror 19 at the other end. A rotating scanning element 15 is mounted on the frame at the output end of the telescope. The scanning element may be a prism, a diffractive element or a rotating mirror. In the embodiment shown a prism 15 is used, the prism being cylindrical in configuration with flat ends 20 and 21 (FIG. 2) positioned at an angle to each other, with the prism rotating about its axis. The telescope and scanner configurations shown are a preferred embodiment but other types of telescope and scanners would work as well.

The system is provided with an optical axis or path 16 extending from a detector 18 at one end to the secondary mirror 19 at the other end. The secondary mirror 19 is positioned such that laser radiation traveling along the optical path is reflected to the primary mirror 14 and through the prism 15 toward a target (not shown), such as atmospheric aerosols distributed at all ranges. Returned radiation from the target passes through the prism 15 and is reflected off the primary mirror 14 and the secondary mirror 19 to travel along the optical path 16 to the detector 18.

Positioned between the detector 18 and the secondary mirror 19 is a polarizing beam splitter 23. A laser transmitter 24 is positioned to direct a laser beam into the beam splitter and have the beam or pulse travel along the optical path, with its polarization being changed to circular from linear polarization by a quarter waveplate 28 on the optical path. The circularly polarized beam is then reflected to the primary mirror 14 and out through the rotating prism 15 toward the target. After sending the laser pulse, the transmitter 24 becomes quiescent as it waits for the return radiation from the target. If the prism 15 is not scanning, the return radiation will be reflected off the mirrors 14 and 19 and travel along the optical path 16 to the detector 18, this path of travel being the same as the path of the transmitted pulse. The polarization of the returned radiation changes from circular to linear at it passes through the quarter waveplate 28. The linear polarization of this returned signal is orthogonal to the transmitter polarization so that the returned signal passes unimpeded through the beam splitter 23 toward the detector.

If the prism 15 is scanning, as will be the case of this system, the prism is at one point (in its rotation) when the transmitted pulse is sent and at another point when the return pulse arrives. This angular lag causes the return pulse to travel along a path which is off the optical path 16, causing a loss of power in the returned pulse. The greater the lag, the greater will be the power loss.

This problem is solved by using a beam de-rotator or prism 30 positioned on the optical path 16 between the beam splitter 23 and the detector 18. The de-rotator is made from a material which is transparent to laser radiation and which has two opposed flat surfaces 45 and 46 (FIG. 4) which are positioned at a slight angle to each other, with one of the flat surfaces being positioned at a forty five degree angle relative to the optical path.

Figure 2:
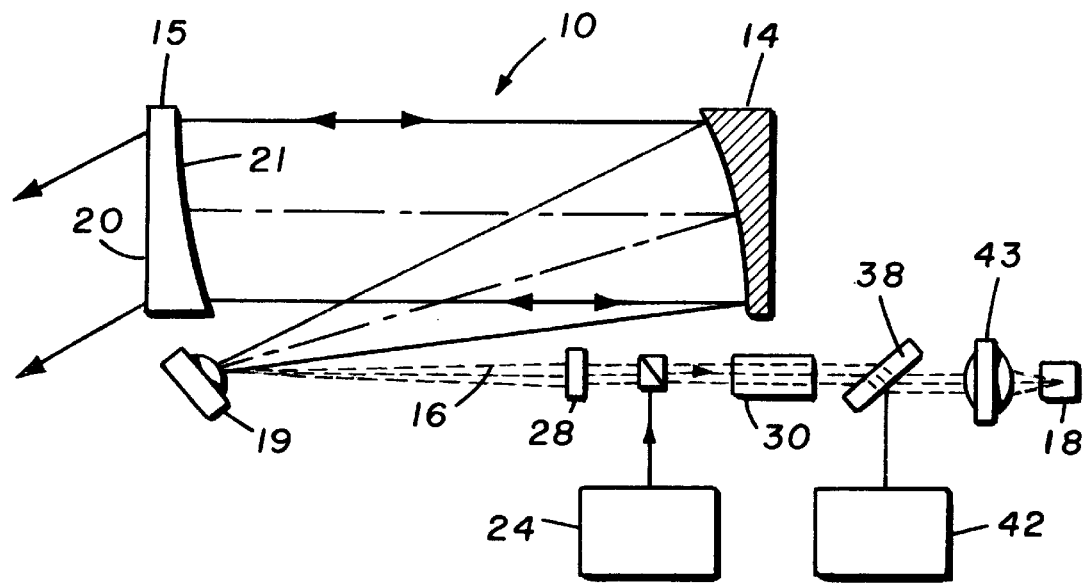
FIG. 2 is a view of the structure of FIG. 1 showing the apparatus of FIG. 1 with the scanning element and the beam de-rotator rotated to another position 90° from the position shown in FIG. 1.

The de-rotator is rotated about the optical path in synchronism with the prism 15. This synchronism is achieved by using the electrical signal from an encoder 35 which drives the prism 15 to drive a motor 36 which drives the de-rotator 30, as shown in FIG. 1.

Figure 3:
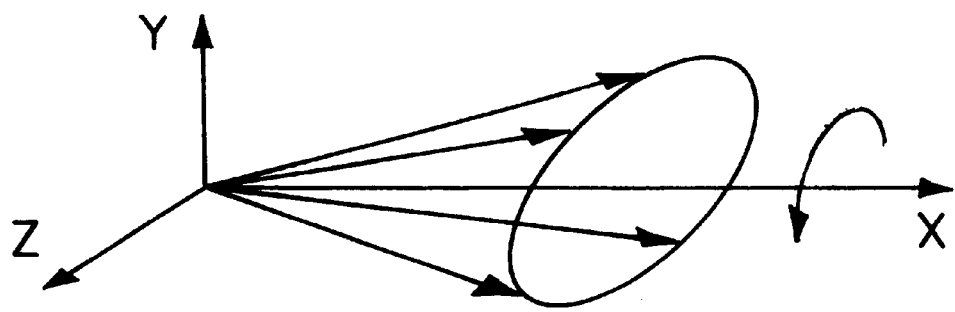
FIG. 3 is a schematic representation of the conical scan pattern, with the arrows surrounding the X axis showing the direction of the transmitted beams.

FIG. 3 is a schematic representation of the manner in which the signal is transmitted. The arrows surrounding the X-axis show the directions of the transmitted beam as the prism is rotated.

Figure 4:
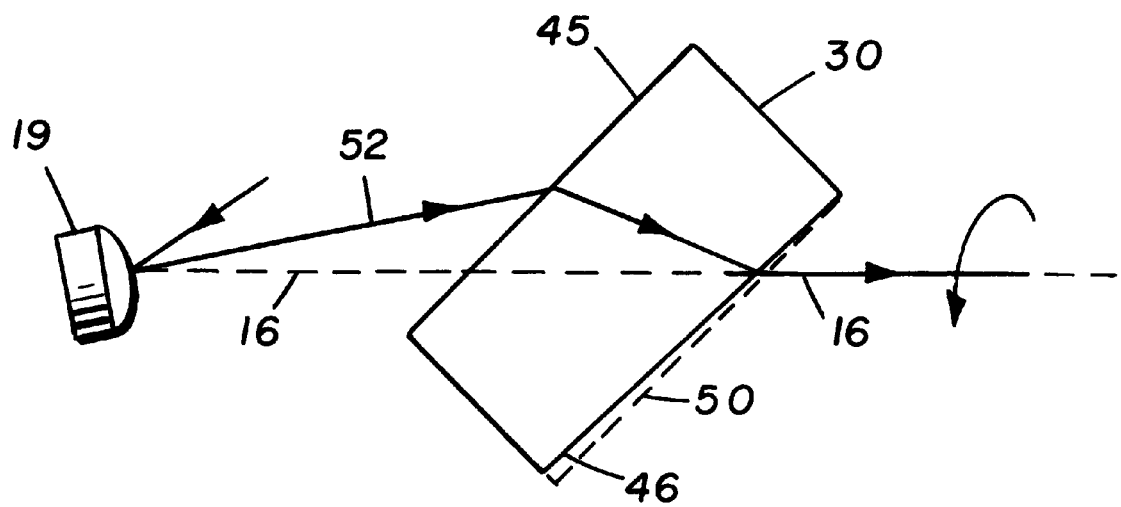
FIG. 4 is an enlarged side view of the de-rotator better showing its operation.

FIG. 4 better shows the operation of the de-rotator 30. The de-rotator is a prism having opposed faces 45 and 46 positioned at a slight angle to each other. The plane represented by the dashed line 50 is parallel to the face 45. If the prism is not rotating (and without the de-rotator 30), the returned beam will be reflected along the optical path 16 to the detector 18.

With the prism 15 rotating, the returned beam will be reflected in a direction not lying on the optical path 16. This reflected beam is represented by reference numeral 52 in FIG. 4. FIG. 4 clearly shows how the returned beam is refracted back onto the optical path 16 by the de-rotator or prism 30.

After passing through the de-rotator 30 the beam passes through a second beam splitter 38, where a heterodyning beam from a local oscillator 42 is added to the return beam, with both beams passing through a lens 43 to the detector 18. The result of the combination of the heterodyning beam with the return beam will detect the Doppler shift frequencies in the return beam without a loss of power in the return beam. This system can also be used for other measurements in addition to Doppler shift, such as ranging and target reflecting.

The use of the telescope is preferred but is optional. The transmitted beam may pass through the quarter waveplate 28 directly to the scanning element 15, with the returned beam being passed through (or reflected by) the scanning element directly to the quarter waveplate 28.

FIG. 5 is a fragmentary view showing the use of a mirror 60 as the scanning element, the mirror being rotated about an axis 61. It can be seen that in this embodiment the system is physically positioned between the mirror and the target (not shown).

What is claimed is:

1. A lidar remote sensing system having an optical path, comprising
   a. a frame;
   b. a rotating scanning element supported by the frame and positioned between the remainder of the system and a target for directing a transmitted beam from the optical path toward a target in a conical scan;
   c. means for injecting a transmitted laser beam into said optical path to be directed to the scanning element;
   d. a detector positioned on the optical path for detecting a reflected beam from the target; and
   e. a rotating prism positioned on the optical path for refracting said reflected beam back onto the optical path, said scanning element and said prism being rotated in synchronism.

2. The apparatus of claim 1 wherein the scanning element is a prism.

3. The apparatus of claim 1 wherein the scanning element is a mirror.

4. A lidar remote sensing system, comprising
   a. a frame;
   b. a telescope mounted on the frame and having opposite ends with a primary mirror at one end and a secondary mirror at the other end, said secondary mirror being positioned at one end of an optical path;
   c. a rotating scanning element positioned between the primary mirror and a target for directing a laser beam transmitted through the telescope toward the target in a conical scan;
   d. means for injecting a transmitted laser beam into said optical path to be directed through the telescope and the scanning element toward the target;
   e. a detector positioned at the other end of the optical path for detecting a reflected beam from the target; and
   f. a rotating prism positioned on the optical path for refracting said reflected beam back onto said optical path, said scanning element and said prism being rotated in synchronism.

5. The system of claim 4 wherein the system includes means for injecting a heterodyning laser beam into said optical path to be directed onto the detector with the reflected beam for determining the Doppler frequency shift in said reflected beam.

6. The system of claim 5 wherein a quarter waveplate positioned on the optical path between the first beam splitter and the secondary mirror changes the polarization of the transmitted beam from linear to circular and the reflected beam from circular to linear.

7. A lidar remote sensing system, comprising
   a. a support frame;
   b. a telescope mounted on the frame, said telescope having opposite ends with a primary mirror at one end a secondary mirror at the other end, said secondary mirror being positioned at one end of an optical path, said telescope having a rotating scanning element positioned at the primary mirror and a target for directing a laser beam transmitted through the telescope toward the target in a conical scan;
   c. a detector positioned at the other end of the optical path for detecting a reflected beam from the target;
   d. a first beam splitter mounted on said optical path between the detector and the secondary mirror;
   f. a laser transmitter mounted to direct a transmitted laser beam into the beam splitter and along said optical path; said secondary mirror being positioned to reflect said transmitted beam traveling along the optical path onto the primary mirror and through the scanning element to the target and to reflect the reflected beam from the primary mirror back toward the detector;
   g. a prism mounted on the optical path between the beam splitter and the detector, said prism being rotated in synchronism with the scanning element for refracting the reflected beam onto the optical path; and
   h. a second beam splitter and a local oscillator for directing a heterodyning laser beam onto the optical path and into the detector with the reflected beam for detecting the Doppler shift in the return beam.

8. The system of claim 7 wherein said prism is made of a material transparent to laser radiation and having opposed flat surfaces at a wedge angle to each other.

9. The system of claim 8 wherein the prism is rotated about the optical path with one of said flat surfaces being at an acute angle to said optical path.

10. The system of claim 9 wherein said one flat surface is positioned at a 45° angle to said optical path.

11. The system of claim 9 wherein the scanning element is a prism.

12. The system of claim 9 wherein the scanning element is a mirror.

* * * * *